(12) United States Patent
Pasternak et al.

(10) Patent No.: US 10,382,116 B2
(45) Date of Patent: Aug. 13, 2019

(54) RADIO COMMUNICATION RECEIVER CANCELLING OUT THE CROSS POLARISATION OF A RECEIVED SIGNAL

(71) Applicants: Zodiac Data Systems, Courtaboeuf (FR); CENTRE NATIONAL D'ETUDES SPATIALES, Paris (FR)

(72) Inventors: Nicolas Pasternak, Fontenay aux Roses (FR); Alain Thomas, Clamart (FR); Clément Dudal, Toulouse (FR); Mathieu Llauro, Villebon sur Yvette (FR); Jean-Pierre Millerioux, Toulouse (FR)

(73) Assignees: Zodiac Data Systems (FR); CENTRE NATIONAL D'ETUDES SPATIALES (FR)

( * ) Notice: Subject to any disclaimer, the term of this patent is extended or adjusted under 35 U.S.C. 154(b) by 0 days.

(21) Appl. No.: 16/072,694

(22) PCT Filed: Jan. 27, 2017

(86) PCT No.: PCT/EP2017/051861
§ 371 (c)(1),
(2) Date: Jul. 25, 2018

(87) PCT Pub. No.: WO2017/129799
PCT Pub. Date: Aug. 3, 2017

(65) Prior Publication Data
US 2019/0036593 A1    Jan. 31, 2019

(30) Foreign Application Priority Data

Jan. 27, 2016 (FR) ...................................... 16 50651

(51) Int. Cl.
*H04L 5/12* (2006.01)
*H04B 7/10* (2017.01)
(Continued)

(52) U.S. Cl.
CPC .............. *H04B 7/10* (2013.01); *H04B 7/002* (2013.01); *H04B 7/04* (2013.01); *H04B 17/336* (2015.01)

(58) Field of Classification Search
CPC ........ H04B 7/10; H04B 17/336; H04B 7/002; H04B 7/04
(Continued)

(56) References Cited

U.S. PATENT DOCUMENTS

| 4,575,862 A | 3/1986 | Tahara et al. |
| 2004/0127179 A1* | 7/2004 | Sasaki ...................... H04B 7/10 455/146 |

(Continued)

FOREIGN PATENT DOCUMENTS

| EP | 0307950 A2 | 3/1989 |
| EP | 1940061 A1 | 7/2008 |

(Continued)

OTHER PUBLICATIONS

International Search Report for PCT/EP2017/051861, dated Apr. 6, 2017, 3 pages.

*Primary Examiner* — Zewdu A Kassa
(74) *Attorney, Agent, or Firm* — Lerner, David, Littenberg, Krumholz & Mentlik, LLP

(57) ABSTRACT

The invention relates to a radio communication receiver receiving a radio signal (S) including a main polarisation (MAIN-POL) and a secondary polarisation (X-POL) orthogonal to the main polarisation (MAIN-POL), the receiver including: a unit (1) for receiving the main polarisation (MAIN-POL) and the secondary polarisation of the received signal, synchronised as a carrier frequency with the main polarisation (MAIN-POL); a unit (2) for cancelling out the secondary polarisation synchronised with the main polarisation (MAIN-POL) and configured to suppress, from the received signal (S), the interference due to the secondary (Continued)

polarisation (X-POL), the unit (2) for cancelling out the secondary polarisation including a filtering unit (21) that receives the main polarisation (MAIN-POL) and the secondary polarisation (X-POL) as input; a unit (3) for demodulating the filtered signal, located downstream of the cancellation unit and configured to calculate carrier frequency error information and to communicate same by feedback to the upstream receiving unit (1).

10 Claims, 5 Drawing Sheets

(51) Int. Cl.
  *H04B 7/00* (2006.01)
  *H04B 17/336* (2015.01)
  *H04B 7/04* (2017.01)

(58) Field of Classification Search
  USPC ........ 375/262, 261, 260, 259, 316, 295, 219
  See application file for complete search history.

(56) References Cited

U.S. PATENT DOCUMENTS

2009/0143042 A1\* 6/2009 Kawai .................... H04B 1/126
                                                                    455/296
2010/0158161 A1 6/2010 Sambhwani et al.

FOREIGN PATENT DOCUMENTS

EP    2560306 A1    2/2013
FR    2774831 A1    8/1999

\* cited by examiner

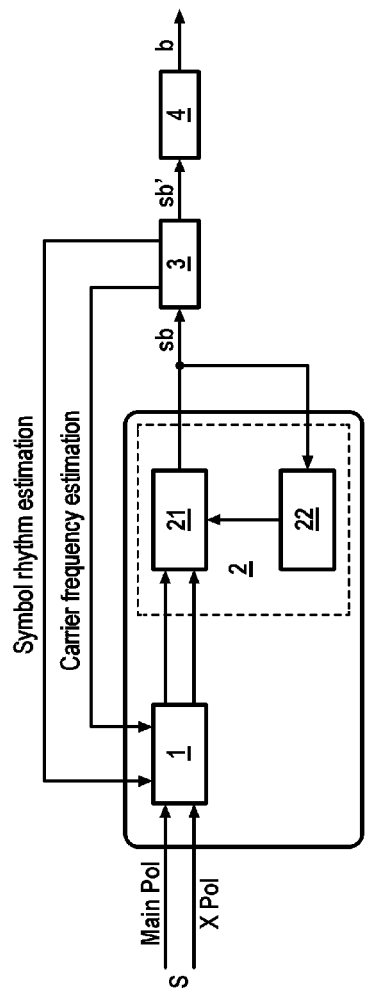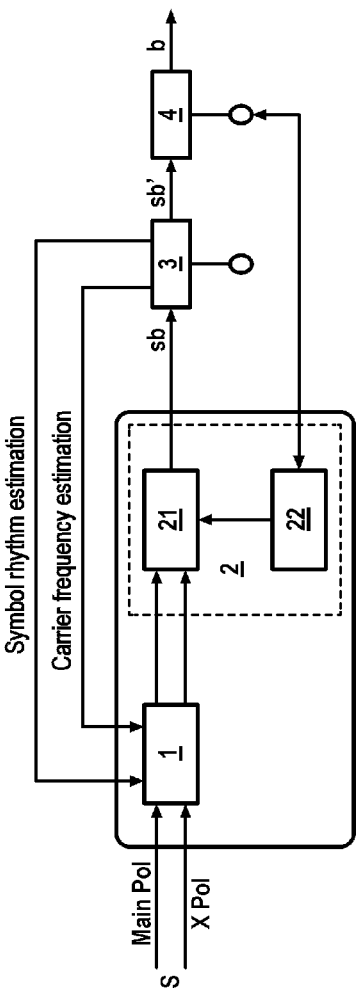

RADIO COMMUNICATION RECEIVER CANCELLING OUT THE CROSS POLARISATION OF A RECEIVED SIGNAL

CROSS-REFERENCE TO RELATED APPLICATIONS

The present application is a national phase entry under 35 U.S.C. § 371 of International Application No. PCT/EP2017/051861 filed Jan. 27, 2017, published in French, which claims priority from French Application No. 1650651 filed Jan. 27, 2016, all of which are incorporated herein by reference.

GENERAL TECHNICAL FIELD

The invention relates to a digital receiver and especially a receiver configured to cancel interference due to crossed polarisation of a signal comprising two orthogonal polarisations.

PRIOR ART

In terms of radio communications, the bulk of the frequential spectrum is such that to optimise the spectral resource radio signals are transmitted in two orthogonal polarisations. This is particularly true for directive communications encountering few obstacles, such as communications by satellite or terrestrial transmitters. In this way, spectral capacity is doubled.

One problem is that the isolation performances between polarisations of receiving and sending antennas as well as atmospheric propagation create interference between crossed polarisations.

In general, the signals coming from both approximately orthogonal of the antenna can be demodulated, but interference degrades the bit error rate at reception.

This effect is the greatest for communications devices (for example satellites) which use carriers at the same rate in the two polarisations (for example for high-rate telemeasuring of observation satellites of the Earth in low orbit).

The use of iso-flow double-polarisation antennas on board scrolling satellites (that is, whereof the diagram varies with the elevation of the satellite seen from the station during passage to provide a constant flow on ground) or of double polarisation antennas of large opening heightens interference due to crossed polarisation relative to the use of antennas with narrow opening edge and pointing the receiving station which exhibit better cross-polarisation performance.

Known solutions to the problem of separation of polarisations consist of an autonomous device placed upstream of the receivers, that is, synchronisation, demodulation and decoding functions.

Such a device searches for the best combinations of the two signals of the antenna by minimising a criterion applied to the waveforms extracted at its output, without using data originating from the downstream receiver (for example, criterion of CMA type (Constant Modulus Algorithm)), which minimises the variation of complex envelope of the extracted signal).

However, these techniques function less well with variable envelope modulations such as filtered modulations, the constellations presenting symbols of different energies or communications in bursts. In particular, these models do not allow joint equalisation processing.

Known solutions such as that described in EP1940061A1 need carrier phase recovery prior to cancellation or demodulation, which is not possible with modulations received at very low signal-to-noise ratio, such as those using powerful codings (turbo codes or LDPC) to operate at the limit of the Shannon capacity, or in the presence of major interference from crossed polarisation. Others such as EP2560306A1 or EP307950A2 propose improving processing of interference via a transverse filter by adding a temporal realignment system of the secondary polarisation on the main, which complicates the device. These devices estimate error criteria from variations with former symbols where the signal-to-noise ratio or signal-to-interference ratio is low and therefore disallows equalisation on waveforms provided for functioning near the Shannon limit.

Other known solutions propose independently processing each of the polarisations to cancel out the crossed polarisation. In this way, reference could be made to document U.S. Pat. No. 4,575,862.

Therefore, known solutions are complex and need upstream processing and do not apply to all communication cases.

PRESENTATION OF THE INVENTION

The invention proposes eliminating all these disadvantages by proposing a device allowing at the same time the possibility of performing equalisation along with cancellation, synchronisation in phase of the carrier performed after cancellation of interference, whether this is in a blind or aided demodulation mode (bursts) and temporal realignment of the main and secondary polarisations.

For this purpose, the invention proposes a radio communication receiver receiving a signal radio comprising a main polarisation and a secondary polarisation orthogonal to the main polarisation, the receiver comprising:
- a receiving unit of the main polarisation and of the secondary polarisation of the received signal, synchronized as carrier frequency on the main polarisation;
- a cancellation unit of the secondary polarisation synchronized on the main polarisation and configured to cancel, from the received signal (S), interference due to the secondary polarisation, the cancellation unit of the secondary polarisation comprising a filtering unit receiving at input the main polarisation and the secondary polarisation to:
    filter the components in phase of the secondary polarisation contributing to interference of the main polarisation, for its components in phase and in quadrature;
    filter the components in quadrature of the secondary polarisation contributing to interference of the main polarisation, for its components in phase and quadrature;
    adding the components filtered in this way to the components in phase and in quadrature of the main polarisation such that the filtered signal coming from the filtering unit deletes the contribution of the secondary polarisation on the main polarisation, the filtered signal coming from the filtering unit comprising only the contribution of the main polarisation;
- a demodulation unit of the filtered signal, located downstream of the cancellation unit and configured to calculate carrier frequency error information and communicate it by retroaction to the upstream receiving unit.

The invention is advantageously completed by the following characteristics, taken singly or in any one of their technically possible combinations:

the cancellation unit of the secondary polarisation comprises a filtering unit of the received signal, the filtered signal at output comprising only the contribution of the main polarisation;

the cancellation unit of the secondary polarisation comprises an estimation unit of the filter intended to cancel out the interference due to the secondary polarisation from the received signal;

the receiver comprises a demodulation unit of the filtered signal configured to extract from the filtered signal supple symbols after filtering, the ideal filter being the adapted filter which maximises the signal-to-noise ratio for a channel AWGN, this filter able to be combined with a secondary equalization filter of the channel.

The receiver provides frequential error or carrier phase information and other rhythm symbol information which is sent back to the synchronisation unit.

the receiver also comprises a decoder configured to decode the supple symbols;

at any given time the filter is estimated from the filtered signal the preceding instant;

the filter is estimated from the supple symbols;

the filter is estimated from the extrinsic information or the supple symbols after decoding;

the filter is estimated from the signal after the adapted filter by taking as error criterion a distance from an expected pattern such as for example a constant envelope or a constellation;

the filter is estimated also given corrections made by the secondary equalization filter.

The invention reduces interference between the polarisations which utilise at input the two polarisations previously synchronized on the rhythm and the carrier frequency of all or part of the signal in the polarisation of interest.

PRESENTATION OF FIGURES

Other characteristics, aims and advantages of the invention will emerge from the following description which is purely illustrative and non-limiting, and which must be considered with respect to the appended drawings, in which:

FIGS. 1a, 1b and 1c illustrate a receiver according to the invention;

Figure 3:
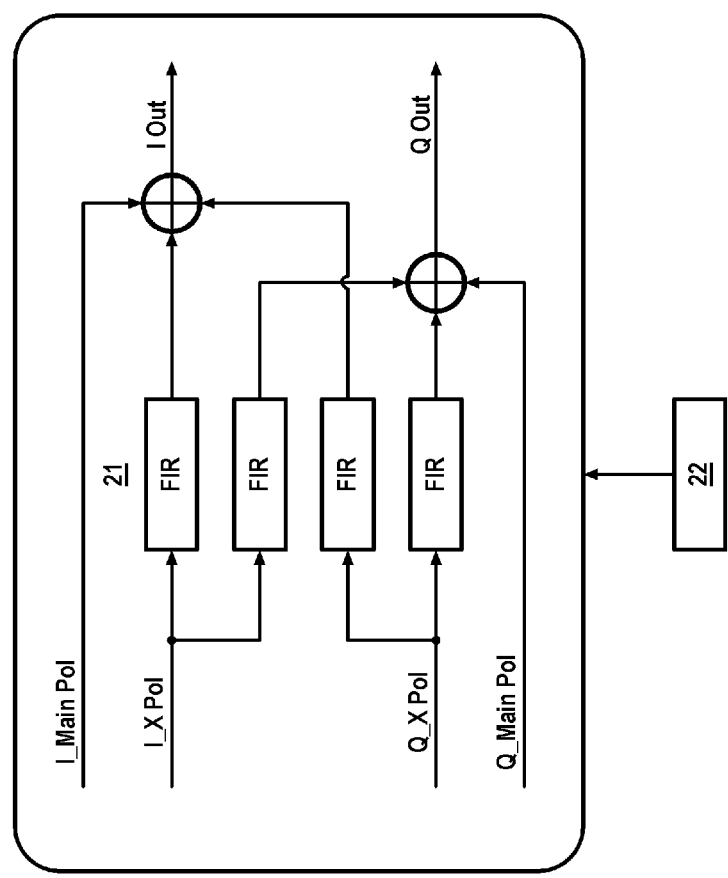
Figure 4:
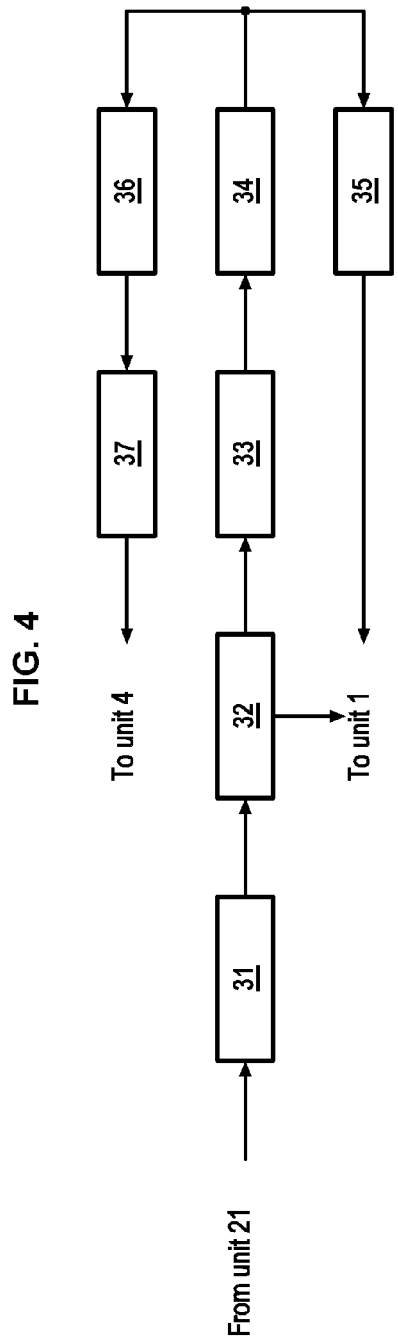

FIG. 3 schematically illustrates a possible implementation of the interference cancellation unit;

FIG. 4 illustrates a possible implementation of a pilot-aided demodulation unit of a receiver according to the invention.

DETAILED DESCRIPTION OF THE INVENTION

Figure 1C:
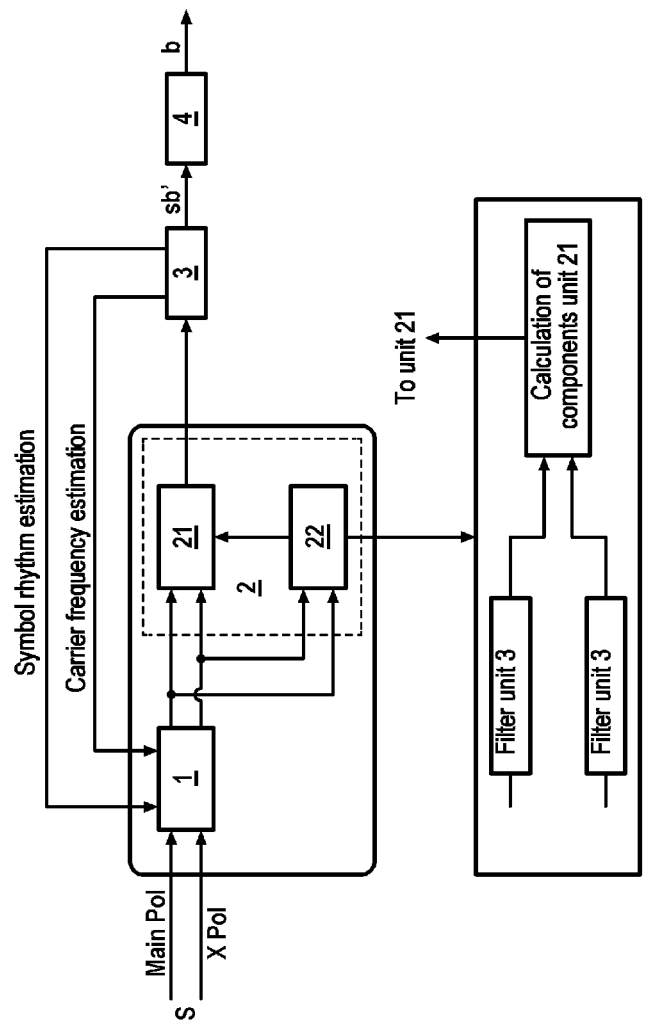

FIGS. 1a, 1b, 1c illustrate a radio communication receiver receiving at input a signal radio, originating from a satellite for example.

This received signal S comprises a main polarisation MAIN-POL and a secondary polarisation X-POL orthogonal to the main polarisation MAIN-POL.

It is considered that the polarisation of interest is the main polarisation MAIN-POL.

The receiver comprises:
a receiving unit 1 of the two polarisations of the received signal which is synchronized as carrier frequency on the polarisation principal MAIN-POL;
a cancellation unit 2 of the secondary polarisation also synchronized on the main polarisation MAIN-POL;
a demodulation unit 3 which especially communicates information frequential and optionally rhythm symbol by retroaction with the receiving unit 1;
a decoding unit 4.

Each element constituting the receiver will be described hereinbelow.

Receiving Unit 1

The receiving unit 1 receives the signal comprising the two polarisations MAIN-POL, X-POL which are communicated to the cancellation unit 2 of the secondary polarisation, also synchronized on the main polarisation MAIN-POL.

The particular feature of the receiving unit 1 is that it synchronizes the two polarisations on the main polarisation MAIN-POL as carrier frequency and as rhythm symbol, from the information supplied by a demodulation unit 3 downstream of the cancellation unit (the demodulation unit 3 will be described in detail hereinbelow).

Figure 2:
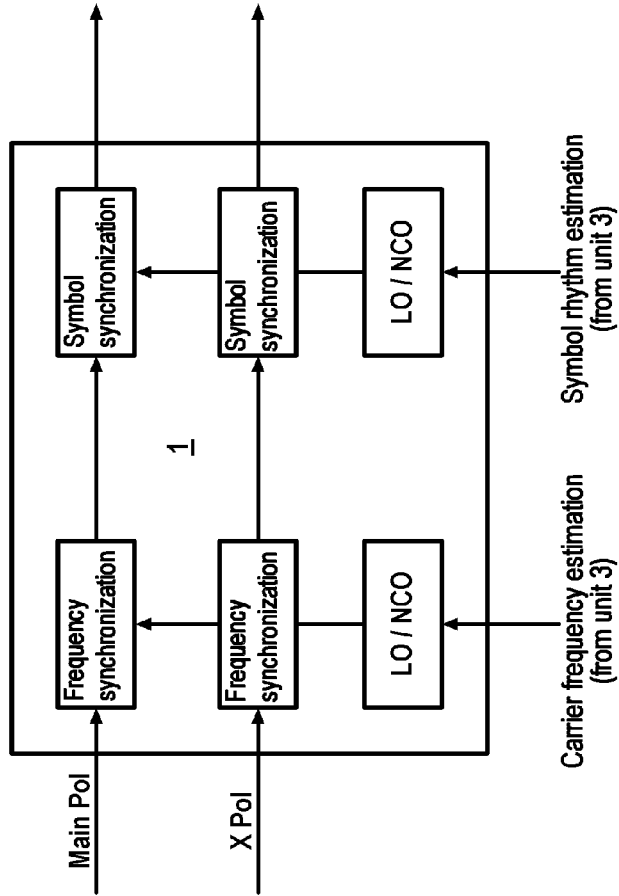
FIG. 2 illustrates a detailed diagram of the filtering unit of the cancellation unit of the secondary polarisation of the receiver of FIG. 1.

FIG. 2 illustrates in detail the processing events executed by the receiving unit 1. In particular, the frequential error and rhythm symbol information calculated in the downstream stages of the cancellation unit 2 of the secondary polarisation (by a demodulation unit 3 operating in "framed" mode, that is, based on detection of a header, if not in "classic" mode due to a phase recovery system of PLL type, or else in "turbo" mode employing a decoding unit 4 to create a retroaction using extrinsic values) to:

by means of a local oscillator LO/NCO returning the signal MAIN-POL in baseband and slaving X-POL to this same information;

sample the signals MAIN-POL and X-POL from a multiple rhythm of the rhythm symbol of MAIN-POL and at the optimal time.

Cancellation Unit 2 of the Secondary Polarisation

The cancellation unit 2 of the secondary polarisation, also synchronized on the main polarisation MAIN-POL, deletes the interference due to the secondary polarisation X-POL of the received signal S.

In particular, the cancellation unit 2 of the secondary polarisation comprises a filtering unit 21 of the main MAIN-POL and secondary X-POL components of the received signal S from filters estimated by an estimation unit 22 of filters designed to delete the signal intended for secondary polarisation X-POL of the received signal.

The cancellation unit 2 of the secondary polarisation comprises a filtering unit 21 receiving at input the received signal S comprising the main polarisation MAIN-POL and the secondary polarisation X-POL so as to:

filter the components in phase of the secondary polarisation contributing to interference of the main polarisation, for its components in phase and in quadrature;

filter the components in quadrature of the secondary polarisation contributing to interference of the main polarisation, for its components in phase and quadrature;

add these components filtered in this way to the components in phase and in quadrature of the main polarisation such that the filtered signal coming from the filtering unit 21 wipes the contribution of the secondary polarisation on the main polarisation.

In relation to FIG. 3, the filtering unit 21 is constituted by a set of digital filters having finite impulse response (FIR)

real to a dimension (a flow of real samples at input and a flow of real samples at output).

Four filters FIR can be used, as illustrated in FIG. 3, for the contribution of each input in phase I or in quadrature Q on each output in phase or in quadrature. In a simplified implementation, the set equals a complex filter FIR which acts on a signal of complex envelope I+jQ. In this case, the filter retains all phase rotation of the input at the output and the real filters comprising the latter verify that the transfer function of I→I is identical to that of Q→Q and that of I→Q is opposite that of Q→I.

The proposed structure of the group of filters 21:

ensures temporal compensation (such as a delay difference) between the main polarisation and the secondary polarisation;

retains phase rotations of signals in baseband to allow coherent demodulation downstream of the cancellation of interference and be insensitive to the carrier phase error.

The components in phase I_X-POL and in quadrature Q_X-POL of the secondary polarisation X-POL are filtered by such filters FIR so as to reshape the opposite of the contributions of the interference X-POL present on each of the components in phase and in quadrature of Main-POL. Adding to these components of the main polarisation supplies the components in phase Iout and quadrature Qout comprising no more than the contribution of the main polarisation MAIN-POL.

Therefore, at output of the filtering unit 21, there are raw symbols sb tainted by noise and channel distortions but exempt from crossed polarisation interference X-POL.

The estimation unit 22 of the filters will determine the filters which will cancel the contribution of the secondary polarisation X-POL. For this it minimises the distance or maximises the likelihood between a sequence of these symbols and its expected profile.

Demodulation Unit 3

FIG. 4 illustrates in detail a possible implementation of a demodulation unit 3 in framed mode or pilot-aided to illustrate possible interactions with the calculation unit of the cancellation of interference (unit 22) and with the synchronisation unit 1.

In relation to FIG. 4, the demodulation unit 3 comprises:

an adapted filter 31 maximising the signal-to-noise ratio of the expunged signal of polarisation interference allowing upstream estimations at maximum likelihood;

an estimation block 32 of the rhythm and phase symbol for the unit 1;

a channel equalisation block 33 by way of example of equalisation along with equalisation of the cancellation of polarisation interference, the equalisation channel designating any defect of the transmission channel other than polarisation interference (inter symbol, modulation distortion, analog filters etc.);

a pilot detection correlator 34 (known pattern);

an offset estimation block 35 of carrier frequency (which could be done on the pilots) for the unit 1;

a phase offset correction block 36 between the local oscillator and the carrier;

a block 37 known as "demapping" extracting supple symbols for the unit 1 from the constellation.

The demodulation unit 3 of the filtered signal (that is, raw symbols sb tainted with noise):

extracts from this filtered signal information symbols sb', a symbol sb' which can be associated with all the elements of an alphabet B (transmitted by the sender) with associated probabilities, the set or a subset of these probabilities constituting a supple symbol. For this to occur the adapted filter maximising the signal-to-noise ratio can be implemented so as to maximise the signal-to-noise ratio at input of the calculation cancellation of crossed polarisation interference (cancellation of the interference knowing the adapted filter);

extracts carrier frequency error information and rhythm symbol for the receiving unit 1 from this signal;

equalizes the channel defects, imbalances modulation I/Q, inter-symbol interference, multi-trajectories, and sends back the signal at input of the cancellation unit 2 of the secondary polarisation so as to maximise the signal-to-distortion ratio at input of the cancellation unit of the secondary polarisation.

Decoding Unit 4

The decoding unit 4 channel processes the symbols s'b, called supple (coming from the demodulation unit 3) as a function of the channel coding which has been used (turbo coding, LDPC, viterbi, Reed-Solomon, etc.) and corrects any demodulation errors of the demodulation unit 3 of the downstream filtered signal.

The decoding unit 4 can also provide probabilistic information known as extrinsic to the estimation unit 22 of the filter, upstream, in light of calculation of this filter.

In other terms, the decoding unit 4 supplies a suite of binary words b corresponding to the most probable symbols sent.

Several configurations of an embodiment of the receiver described above will be described.

FIG. 1a illustrates a receiver where the cancellation unit 2 of the interference functions in blind mode without need for a demodulation unit 3. According to this first embodiment, the filters at any given time are estimated from the filtered signal at output of the filtering unit 2) the preceding instant.

FIG. 1b illustrates a receiver where the cancellation unit 2 of the interference takes at its input a signal coming from the demodulation unit 3 or a signal coming from the decoding unit 4.

According to a second embodiment, the cancellation unit 2 of the secondary polarisation takes at its input a signal coming from the demodulation unit 3 so as to calculate its error signal updating its filter by maximising the signal-to-noise ratio and/or its signal-to-distortion ratio channel. In this second embodiment, it is the symbols filtered by the adapted filter of the demodulation unit 3 which are used for estimating the filters of the estimation unit 22 of the filter.

According to a third embodiment, the filters of the estimation unit 22 of the filter are estimated from the information symbols affected by probability (symbols sb').

In FIG. 1b the interrupter returning the symbols is positioned on the decoding unit 4 or on the demodulation unit 3. When it is on the demodulation unit 3 this corresponds to the second or third embodiment depending on viewpoint after the adapted filter or after equalisation and supple demapping symbol.

With respect to the second and third embodiments, it is said that the receiver is in non-blind mode, or Data Aided or at a minimum the constellation of the signal is known so that it is synchronised correctly in the region of the receiving unit 1, and the filter is correctly estimated. In such a case, the received signal comprises expected symbols which can retrieve the rhythm or frequency information supplied to the receiving unit 1. These symbols could be used in the second embodiment. Therefore, for these embodiments relative to the estimation unit 22 the distance and/or the likelihood between a sequence of symbols and its expected profile are measured: this can be single words (simple detection by correlation), if not symbols detected in a constellation (minimal dispersion in amplitude and phase per criterion LMS (Least Mean Square), or RLS (Recursive Least Square), if not in amplitude alone by criterion of CMA type).

According to a fourth embodiment, the filters are estimated from the extrinsic information symbols b at output of the decoding unit 4.

With respect to the fourth embodiment, estimation of the filter is done by methods known as iterative consisting of minimising the error probability represented by the extrinsic information of the unit 4, the algorithm BCJR could for example be used, or backward-forward.

Also, the coefficients of filters are regularly corrected by a gradient method, Newton or other converging towards the optimal solution.

According to a fifth embodiment, illustrated in FIG. 1c, the receiver is similar but the filters of the cancellation unit 2 of the secondary polarisation are estimated from the signals synchronized by the unit 1 and filtered by the filters of interest of the unit 3 duplicated in the estimation unit 22 of the filter on each of the inputs, according to FIG. 1b. This fifth mode is mathematically equivalent to the second, third and fourth embodiments in that the filtering operations are commutative, but once the fluctuation of the polarisation interference is slow performs calculations on noncontiguous blocks of samples in light of increasing processing rates. It is noted that this structure, mathematically equivalent since the filters switch with each other, allows for easier implementation for very high-rate equalisation, in block mode for example.

These five modes can be combined independently with the option of filtering of components of the synchronized signal described above.

The invention claimed is:

1. A radio communications receiver receiving a radio signal comprising a main polarisation and a secondary polarisation orthogonal to the main polarisation, the receiver comprising:
    a receiving unit for receiving the main polarisation and for receiving the secondary polarisation of the received signal, synchronized as carrier frequency on the main polarisation;
    a cancellation unit for canceling the secondary polarisation synchronized on the main polarisation (and configured to cancel, from the received signal, interference due to the secondary polarisation, the cancellation unit comprising a filtering unit receiving at input the main polarisation and the secondary polarisation to:
        filter the components in phase of the secondary polarisation contributing to interference of the main polarisation, for its components in phase and in quadrature;
        filter the components in quadrature of the secondary polarisation contributing to interference of the main polarisation, for its components in phase and quadrature; and
        add the components filtered in this way to the components in phase and in quadrature of the main polarisation such that the filtered signal coming from the filtering unit deletes the contribution of the secondary polarisation on the main polarisation, the filtered signal coming from the filtering unit comprising only the contribution of the main polarisation; and
    a demodulation unit for demodulation of the filtered signal, located downstream of the cancellation unit and configured to:
        calculate a carrier frequency error information;
        calculate offset information of the rhythm symbol; and
        communicate, by retroaction to the upstream receiving unit, said calculated carrier frequency error information and said offset information of the rhythm symbol, to synchronize in frequency and rhythm said receiving unit so that the main polarisation and the secondary polarisation are synchronized in frequency and rhythm.

2. The receiver according to claim 1, wherein the components in phase and quadrature in input and in output of the cancellation unit form a complex envelope, the filtering unit being constituted by a single complex filter, that is:
    the filter whereof the input is in phase and the output is in phase is identical to the filter whereof the input is in quadrature and the output in quadrature;
    the filter whereof the input is in phase and the output in quadrature is opposite the filter whereof the input is in quadrature and the output in phase.

3. The receiver according to claim 1, wherein the demodulation unit comprises an adapted filter which optimises the signal-to-noise ratio to demodulate the symbols and whereof the output is applied to the input of an estimation unit of a filter of the cancellation unit to estimate the filters of the filtering unit of the received signal.

4. The receiver according to claim 1, wherein the adapted filter of the demodulation unit is duplicated in the estimation unit on the inputs of the filtering unit to estimate its filters.

5. The receiver according to claim 3, wherein the demodulation unit is also configured to simultaneously equalize channel defects and whereof the output is applied to the input of the estimation unit to estimate the filters of the filtering unit.

6. The receiver according to claim 5, wherein a secondary equalization filter of the demodulation unit is duplicated in the estimation unit to estimate the filters of the filtering unit.

7. The receiver according to claim 3, wherein the demodulation unit is configured to extract of the filtered signal of the supple symbols sent to the estimation unit.

8. The receiver according to claim 3, also comprising a decoding unit configured to decode the supple symbols provided by the demodulation units and whereof the decoded symbols and the extrinsic information are sent to the estimation unit.

9. The receiver according to claim 3, wherein, at any given time, the filters of the cancellation unit are estimated from the filtered signal the preceding instant.

10. The receiver according to claim 4, wherein, at any given time, the filters of the cancellation unit are estimated from the filtered signal the preceding instant.

* * * * *